United States Patent [19]
Vorbrüggen et al.

[11] 3,901,876
[45] Aug. 26, 1975

[54] ADENOSINE DERIVATIVES

[75] Inventors: Helmut Vorbrüggen; Rudolf Kopp; Reinhard Horowski; Gert Paschelke; Dieter Palenschat, all of Berlin, Germany

[73] Assignee: Schering Aktiengesellschaft, Berlin and Bergkamen, Germany

[22] Filed: Sept. 14, 1972

[21] Appl. No.: 288,973

[30] Foreign Application Priority Data
Sept. 18, 1971 Germany............................ 2147314

[52] U.S. Cl.......................... 260/211.5 R; 424/180
[51] Int. Cl............................................. C07d 51/54
[58] Field of Search ...................... 260/211.5 R

[56] References Cited
UNITED STATES PATENTS

| | | | |
|---|---|---|---|
| 3,269,917 | 8/1966 | Imada et al. | 260/211.5 R |
| 3,498,970 | 3/1970 | Yamada et al. | 260/211.5 R |
| 3,590,029 | 6/1971 | Koch et al. | 260/211.5 R |

Primary Examiner—Johnnie R. Brown
Attorney, Agent, or Firm—Millen, Raptes & White

[57] ABSTRACT
Adenosine derivatives of the formula

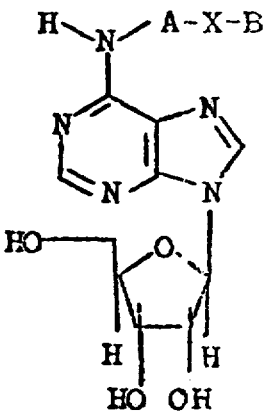

wherein A is saturated or unsaturated, straight-chain, branched or cyclic alkylene optionally substituted by one of hydroxy, acyloxy, carboxy or acyl; X is a valence bond, oxygen, sulfur, or an alkylated or acylated imino group; and B is 3-indolyl or 4-imidazolyl optionally substituted by one or more of halogen, alkyl, haloalkyl, alkoxy, aryloxy, acyloxy, hydroxy, mercapto, alkylmercapto, nitro, carboxy, carboxyalkyl, or methylsulfonylamino, and processes for their preparation and use.

These adenosine derivatives exert pharmacological effects on the central nervous system, the circulation, and the heart.

15 Claims, No Drawings

ADENOSINE DERIVATIVES

BACKGROUND OF THE INVENTION

This invention relates to pharmaceutically active adenosine derivatives. More particularly, this invention relates to adenosine derivatives indirectly substituted on the 6-nitrogen atom with a 3-indolyl or 4-imidazoyl residue.

Adenosine is a well-known glucoside from nucleic acid containing adenine and d-ribose. In recent years, a great deal of interest has been generated with respect to purine nucleosides due to their biochemical importance and their metabolic effects, particularly in mammals. Various purine nucleosides and methods for their preparation have been described, e.g., in U.S. Pat. No. 3,208,997 and German Offenlegungsschrift No. 1670265.

As with most pharmaceutically active preparations, it would be highly desirable to have available metabolically active purine nucleosides which produce particular metabolic effects. In this regard, the compounds of this invention have been found to exhibit a wide range of pharmacological activity, and in particular exhibit marked effects on the central nervous system, the circulatory system and the heart, i.e., they lead to a decrease in spontaneous motor activity, a decrease in the body tonus, and a lowering of the body temperature in test animals. These compounds show activities on the central nervous system, heart and circulatory system in very low doses and are also remarkable because of their very low general toxicity.

OBJECTS OF THE INVENTION

Accordingly, it is an object of this invention to provide new adenosine derivatives and processes for their preparation and use.

Another object of this invention is a process for modifying normal metabolic activity of the central nervous system.

A further object of this invention is a process for modifying normal metabolic activity of the circulatory system.

An additional object of this invention is to provide pharmaceutically valuable compositions.

Upon further study of the specification and appended claims, further objects and advantages of this invention will become apparent to those skilled in the art.

SUMMARY OF THE INVENTION

Briefly, the above and other objects are attained in one aspect of this invention by providing adenosine derivatives of Formula I

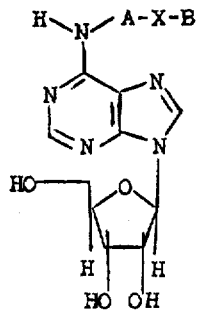

I wherein A is saturated or unsaturated, straight-chain, branched or cyclic alkylene optionally substituted by one of hydroxy, acyloxy, carboxy or acyl; X is a valence bond, oxygen, sulfur, or an alkylated or acylated imino group; and B is 3-indolyl or 4-imidazolyl optionally substituted by one or more of halogen, alkyl, haloalkyl, alkoxy, aryloxy, acyloxy, hydroxy, mercapto, alkylmercapto, nitro, carboxy, carboxyalkyl, or methylsulfonylamino.

In another aspect of this invention, adenosine derivatives of Formula I are prepared by reacting a purine riboside of Formula II

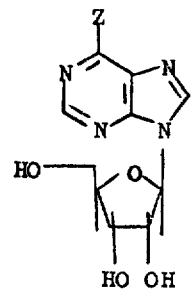

II wherein Z is halogen, i.e., Cl, Br, F or I, or a reactive mercapto group, i.e., alkyl or aryl thiol wherein the thiol group is attached to a methyl group or a primary carbon atom, with an amine of Formula III

H₂N-A-X-B

III wherein A-X-B have the above-indicated meanings.

Yet another aspect of this invention relates to using compounds of Formula I to effect changes in the physiological behavior of the central nervous system, circulatory system, and/or heart of animals.

DETAILED DISCUSSION

The adenosine derivatives of Formula I exhibit valuable pharmacological properties, in particular, in the treatment of deseases where central muscle relaxation is indicated as well as in states in which vasodilatation is necessary.

On testing the CNS-activity the compounds show on parenteral application to rodents a decrease in body tonus, reduced spontaneous motoric activity, abolition of the chronic phase in the maximum electro shock test and suppression of the "writhes" caused by phenyl-p-quinone. Compared to central-muscle relaxing compounds, the compounds of this invention show a very high activity in dose of 0,1 mg/kg and higher as well as a very low toxicity (lethal dose > 800 mg/kg). The compounds cause furthermore a longlasting decrease in body temperature. But up to very high doses there is no indication for a general sympathico/mimetic-symphaticolytic or para-symphaticomimetic-symphaticolytic effect. Concerning the effect on heart and circulation the compounds show an up to 100-fold higher activity compared with adenosine. Since a coronary dilatatory effect is known for adenosine and this effect is increased by dipyridamol (by inhibition of de-aminase, cf L. S. Goodman and A. Gilman, The pharmacological basis of therapeutics, IV. edition 1971, p. 752) there are many aspects for a future therapeutic application of the compounds of this invention. Test procedures were carried out by modified methods described in Irwin S.
  Drug Screening and Evaluation of New Compounds in Animals Nodine J. H. and Siegler P. E.
  Animal and Clinical Pharmacological Techniques in Drug Evaluation Year Book Medical Publ. Chicago 1969, p. 36 and

Morpurgo C.
  A New Design for the Screening of CNS-Active Drugs in Mice Arzneim. Forsch. 21, 1727–1734, 1971

Compounds according to Formula I are those in which A is divalent alkylene of 1–8 carbon atoms, especially of 1–3 carbon atoms. While linear alkylenes are most preferred, e.g., methylene, ethylene, trimethylene, tetramethylene, pentamethylene, hexamethylene, etc., lower alkyl substituted alkylenes of 1–3 carbon atoms, preferably of 1–2 carbon atoms are also suitable, e.g., methylethylene, methylpropylene, ethylethylene, ethylpropylene, etc. Preferably, the alkyl substituent is of 1–2 carbon atoms and is substituted on a non-terminal carbon atom, e.g., 2-methylpropylene, 2-ethylpropylene, etc.

Also suitable are those compounds of Formula I wherein A is olefinically unsaturated divalent alkylene of 2–8 carbon atoms, preferably of 2–4 carbon atoms, e.g., vinylene, propenylene, etc. As with their saturated analogues, these groups can be linear or branched, e.g., 4-propyl-2-pentenylene.

A can furthermore be a divalent alicyclic group. Suitable divalent alicyclic groups are those containing 3–7 ring carbon atoms, e.g., 1,3-cyclopentylene; the ring can be substituted, e.g., with lower alkyl or unsubstituted and can be monoolefinically unsaturated, e.g., 3-cyclohexen-1,2-ylene, or diolefinically unsaturated, e.g., 2,5-cyclohexadien-1,4- ylene.

The term acyl as used herein refers to a radical derived from a carboxylic acid or functional derivative thereof, i.e., a corresponding acid halide, anhydride, amide or ester with a lower alkyl or aryl group. When A is substituted by acyl, preferred are lower alkanoyl, i.e., of 1–7 carbon atoms, especially acetyl, or benzoyl.

Preferred alkylated or acylated imino X groups of Formula I are lower alkylated imino, i.e., of 1–2 carbon atoms, and lower acylated imino, i.e., lower alkanoyl of 1–4 carbon atoms or aroyl of 7–11 carbon atoms, imino groups, e.g., acetamido, benzoylimino, etc.

Preferred compounds of Formula I are those wherein B is unsubstituted or substituted only on a ring carbon atom, preferably at the 2 and 5 position when B is 3-indolyl and the 1 and 5 position when B is 4-imidazolyl. Preferred substituents are halogen, i.e., Cl, Br, F or I, especially Cl or Br; lower alkyl of 1–4 carbon atoms, e.g., methyl, ethyl, etc.; haloalkyl of 1–4 carbon atoms, alkoxy of 1–9 carbon atoms, e.g., methoxy, ethoxy, etc.; aryloxy wherein aryl is phenyl or a phenyl derivative, e.g., phenoxy or benzyloxy; acyloxy wherein acyl is as defined hereinabove, e.g., acetoxy, propoxy, isobutyloxy, p-aminobenzoyloxy, etc; hydroxy; mercapto; alkylmercapto of 1–4 carbon atoms, especially when the thiol group is attached to methyl or a primary carbon atom; nitro; carboxy; carboxyalkyl of 1–4 carbon atoms, or methylsulfonylamino.

Especially preferred are those compounds of Formula I meeting one or more of the following criteria:

a. A is linear saturated alkylene of 1–4 carbon atoms, especially ethylene;
b. X is a valence bond;
c. B is unsubstituted indolyl or indolyl substituted only at the 5-position, preferably by hydroxy, lower alkoxy or lower alkyl;
d. B is unsubstituted imidazolyl or imidazolyl substituted only at the 2 or 5-position, preferably by methyl, ethyl, propyl, butyl.

Compounds of Formula I are prepared in accordance with the process of this invention by reacting a purine riboside of Formula II or the salts thereof, in an inert solvent, e.g., a lower alcohol, tetrahydrofuran, dioxane, etc. but preferably in dimethylformamide, in the presence of 1–2 moles of per mole of Formula II, of a tertiary amine, preferably triethylamine, at room temperature and/or at slightly elevated temperature. The reaction is effected in a manner analogous to the preparation of N-(3-methyl-2-butenyl)adenosine described in Synthetic Procedures in Nucleic Acid Chemistry, Vol. 1, p. 210, Interscience Publishers 1968, the contents of which are incorporated by reference herein.

Suitable starting compounds of Formula II are, in particular, the chlorine and bromine derivatives; these substances are described, for example, in Coll. Czech. Chem. Comm. 30, 1880 (65) and in Biochemical Preparations 10: 148 (1963). Other starting compounds of Formula II can be prepared Suitable reactive mercapto groups Z are those of compounds wherein the thiol group is attached to a methyl group or a primary carbon atom, preferably methylmercapto or benzyl mercapto. The amines of Formula III are commercially available or are prepared by standard methods.

Compounds of the present invention, in addition to those shown in the examples, include:

$N^6$-[β-(5-chloro indolyl-3)-ethyl] adenosine
$N^6$-[β-(5-bromo indolyl-3)-ethyl] adenosine
$N^6$-[β-(5-methyl indolyl-3)-ethyl] adenosine
$N^6$-[β-(2-methyl indolyl-3)-ethyl] adenosine
$N^6$-[β-(5-phenoxy indolyl-3)-ethyl] adenosine
$N^6$-[β-(5-acetyl indolyl-3)-ethyl] adenosine
$N^6$-[β-(5-mercapto indolyl-3)-ethyl] adenosine
$N^6$-[β-(5-methylmercapto indolyl-3)-ethyl] adenosine
$N^6$-[β-(5-nitro indolyl-3)-ethyl] adenosine
$N^6$-[β-(5-carboxy indolyl-3)-ethyl] adenosine
$N^6$-[β-(5-carboxyethyl indolyl-3)-ethyl] adenosine
$N^6$-[β-(5-methylsulfonylamino indolyl-3)-ethyl] adenosine
$N^6$-[β-(5 -chloro imidazolyl-4)-ethyl] adenosine
$N^6$-[β-(5-bromo imidazolyl-4)-ethyl] adenosine
$N^6$-[β-(1-ethyl imidazolyl-4)-ethyl] adenosine
$N^6$-[β-(5-methyl imidazolyl-4)-ethyl] adenosine
$N^6$-[β-(5-ethyl imidazolyl-4)-ethyl] adenosine
$N^6$-[β-(1-benzyl imidazolyl-4)-ethyl] adenosine
$N^6$-[β-(1 -benzoyl imidazolyl-4)-ethyl] adenosine
$N^6$-[β- 2-hydroxy-2(imidazolyl-4)-ethyl] adenosine
$N^6$-[β-(2-methylmercapto imidazolyl-4)-ethyl] adenosine
$N^6$-[β-(2 -ethylmercapto imidazolyl-4)-ethyl] adenosine
$N^6$-[β-(2-nitro imidazolyl-4)-ethyl] adenosine
$N^6$-[β-(5-carboxy imidazolyl-4)-ethyl] adenosine
$N^6$-[β-(5-carboxymethyl imidazolyl-4)-ethyl] adenosine N⁶-[β-(5-methylsulfonylamino imidazolyl-4)-ethyl]adenosine
N⁶-[β-indolyl-3-(2-methylpropylene)] adenosine
N⁶-[β-indolyl-3-(n-propenylene)] adenosine
N⁶-[β-indolyl-3-(1,3-cyclopentylene)] adenosine
N⁶-[β-indolyl-3-(2,5-cyclohexen-1,2-ylene)] adenosine
N⁶-[β-indolyl-3-(2,5-cyclohexadien-1,4-ylene)] adenosine
N⁶-[β-indolyl-3-(2-hydroxypropylene)] adenosine
N⁶-[β-indolyl-3-(2-acetylpropylene)] adenosine
N⁶-[β-imidazolyl-4-(2-methylpropylene)] adenosine
N⁶-[β-imidazolyl-4-(n-propenylene)] adenosine
N⁶-[β-imidazolyl-4-(1,3-cyclopentylene)] adenosine
N⁶-[β-imidazolyl-4-(2,5-cyclohexen-1,2-ylene)] adenosine
N⁶-[β-imidazolyl-4-(2,5-cyclohexadien-1,4-ylene)] adenosine
N⁶-[β-imidazolyl-4-(2-hydroxypropylene)] adenosine
N⁶-[β-imidazolyl-4-(2-ethyloxypropylene)] adenosine
N⁶-[β-imidazolyl-4-(2-carboxypropylene)] adenosine
N⁶-[β-imidazolyl-4-(2-benzoyloxypropylene)] adenosine
N⁶-(β-indolyl-3-thioethyl) adenosine
N⁶-(β-indolyl-3-ethoxy) adenosine
N⁶-[β-(2-methyl-5-hydroxy-indolyl-3)-ethyl] adenosine
N⁶-[β-(2-methyl-5-methoxy-indolyl-3)-ethyl] adenosine
N⁶-[β-(2-ethyl-indolyl-3)-ethyl] adenosine
N⁶-[β-(2-ethyl-5-hydroxy-indolyl)3-ethyl] adenosine
N⁶-[β-(2-ethyl-5-methoxy-indolyl-3)-ethyl] adenosine Due to their nervous and cardiovascular system activity, the compounds of this invention are useful therapeutic agents in the treatment of diseases where central muscle relaxation is indicated as well as in states in which vasodilatation is necessary.

The compounds of this invention can be employed in mixture with conventional excipients, i.e., pharmaceutically acceptable organic or inorganic carrier substances suitable for parenteral, enteral or topical application which do not deleteriously react with the active compounds. Suitable pharmaceutically acceptable carriers include but are not limited to water, salt solutions, alcohols, vegetable oils, polyethylene glycols, gelatin, lactose, amylose, magnesium stearate, viscous paraffin, perfume oil, fatty acid monoglycerides and diglycerides, pentaerythritol fatty acid esters, hydroxy methylcellulose, polyvinyl pyrrolidone, talc, etc.

For parenteral application, particularly suitable are solutions, preferably oily or aqueous solutions, as well as suspensions, emulsions, or implants, including suppositories. Ampoules are convenient unit dosages.

For enteral application, particularly suitable are tablets or dragees having talc and/or a carbohydrate carrier or binder or the like, the carrier preferably being lactose and/or corn starch and/or potato starch. A syrup or the like can be used wherein a sweetened vehicle is employed. Sustained release compositions can also be formulated wherein the active compound is protected with differentially degradable coatings, e.g., by microencapsulation, multiple coatings, etc.

Generally, the compounds of this invention are dispensed in unit dosage form comprising 1–5000 mg. of a pharmaceutical carrier per unit dosage, and the amount of active agent of the invention per unit dosage is about 5 to 50 mg. for mammals.

The compounds of this invention are generally administered to animals, including but not limited to mammals, avians, etc., e.g., laboratory test animals, livestock, household pets, humans, etc. A hyperthermically, muscle relaxant or vasodilatory effective daily dosage of the active compounds as administered parenterally or orally to mammals generally comprises about 0.1 to 50 mg, preferably 0.5 to 5 mg/kg. The dose can be administered singly or as divided dosages throughout the day.

The usefulness of the compounds of this invention as hypothermic agents has been established by testing in laboratory test animals, i.e. rodents. Parenteral and oral administration is preferred, the compounds of this invention being particularly valuable in the treatment of diseases characterized by vasoconstriction. In this regard, they can be employed in substantially the same manner as the known compound dipyramol.

Comparable optimal application rates for a given set of conditions can be ascertained by those skilled in the art using conventional dosage determination tests in view of the above guidelines.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth in degrees Celsius; unless otherwise indicated, all parts and percentages are by weight.

EXAMPLE 1

N⁶-(β-Indolyl-3-ethyl)adenosine 7.16 g. of 6-chloronebularine and 6.46 g. of tryptamine sulfate were suspended in 75 ml. of absolute dimethylformamide and, under a nitrogen atmosphere, 6.93 ml. of triethylamine was added dropwise within 15 minutes. Thereafter, the reaction mixture was agitated for 38 hours at a bath temperature of 60°. The precipitate of triethylamine hydrochloride was filtered off, and the residue was evaporated several times with xylene and recrystallized from 500 ml. of methanol, thus obtaining 5.2 g. (50.5% of theory) of N⁶-(β-indolyl-3-ethyl)adenosine, m.p. 182°.

EXAMPLE 2

N⁶-[β-(5-Hydroxyindolyl-3)-ethyl]adenosine 2.87 g. of 6-chloronebularine and 2.7 g. of serotonin oxalate were dissolved in 70 ml. of absolute dimethylformamide under nitrogen, and 2.77 ml. of triethylamine was added dropwise thereto within 15 minutes. After heating to 50° for 58 hours under a nitrogen atmosphere, the dimethylformamide was removed under a high vacuum. The remainder was crystallized from 100 ml. of water, thus producing 0.683 g. (15% of theory) of N⁶-[β-(5-hydroxyindolyl-3)-ethyl]adenosine, m.p. 140°–142°.

EXAMPLE 3

N⁶-[β-(5-Methoxyindolyl-3)-ethyl]adenosine 7.1 g. of 6-chloronebularine and 4.75 g. of 5-methoxytryptamine were dissolved in 75 ml. of absolute dimethylformamide under nitrogen, and 3.46 ml. of triethylamine was added dropwise within 15 minutes under nitrogen. After 58 hours of agitation at 50° under a nitrogen atmosphere, the triethylamine hydrochloride was filtered off and washed with a small amount of dimethylformamide. The filtrate was evaporated under a high vacuum, and the residue was recrystallized from 200 ml. of methanol or ethanol-water, respectively. The product was 9.06 g. (82% of theory) of $N^6$-[β-(5-methoxyindolyl-3)-ethyl]adenosine, m.p. 199–201°.

EXAMPLE 4

$N^6$-(β-Imidazolyl-4-ethyl)adenosine

Under a nitrogen atmosphere, 10.4 ml. of triethylamine was added dropwise under agitation to 7.1 g. of 6-chloronebularine and 4.6 g. of histamine dihydrochloride in 75 ml. of absolute dimethylformamide within 15 minutes; then, the reaction mixture was stirred for 38 hours at 60°. After filtering off the triethylamine hydrochloride, the filtrate was evaporated under a high vacuum, and the residue was crystallized from methanol, the yield being, in total, 4.74 g. (52% of theory) of $N^6$-(β-imidazolyl-4-ethyl)adenosine, m.p. 127°–129°.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Adenosine derivatives of the formula

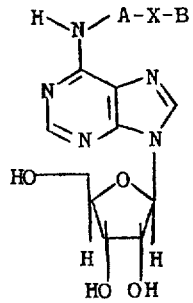

wherein A is alkylene of 1–8 carbon atoms substituted by 0–1 of hydroxy, carboxy, lower alkoxy, lower alkanoyl or benzoyl; X is a valence bond, oxygen, sulfur, or a lower alkylated or a lower alkanoyl or benzoyl acylated imino group; and B is 3-indolyl or 4-imidazolyl substituted on a ring carbon atom by 0–2 of halogen, alkyl of 1–4 carbon atoms, alkoxy of 1–9 carbon atoms, phenoxy, benzyloxy, alkanoyl of 1–7 carbon atoms, aroyl of 7–11 carbon atoms, hydroxy, mercapto, alkylmercapto of 1–4 carbon atoms, nitro, carboxy, carboxyalkyl of 1–4 carbon atoms or methylsulfonylamino.

2. A compound according to claim 1, wherein A is linear saturated alkylene of 1–8 carbon atoms.

3. A compound according to claim 1, wherein X is a valence bond.

4. A compound according to claim 1, wherein B is unsubstituted indolyl or indolyl substituted at one or both of the 2- and 5-positions.

5. A compound according to claim 4, wherein B is substituted by hydroxy or lower alkoxy.

6. A compound according to claim 4, wherein X is a valence bond.

7. A compound according to claim 4, wherein A is linear saturated alkylene of 1–8 carbon atoms.

8. A compound according to claim 1, wherein B is unsubstituted imidazolyl or imidazolyl substituted at one or both of the 1- and 5-positions.

9. A compound according to claim 8, wherein B is substituted by hydroxy or lower alkoxy.

10. A compound according to claim 8, wherein X is a valence bond.

11. A compound according to claim 8, wherein A is linear saturated alkylene of 1–8 carbon atoms.

12. A compound of claim 1, $N^6$-(β-indolyl-3-ethyl) adenosine.

13. A compound of claim 1, $N^6$-[β-(5-hydroxyindolyl-3)-ethyl] adenosine.

14. A compound of claim 1, $N^6$-[β-(5-methoxyindolyl-3)-ethyl] adenosine.

15. A compound of claim 1, $N^6$-(β-imidazolyl-4-ethyl) adenosine.

* * * * *